(12) United States Patent
Bailon et al.

(10) Patent No.: US 7,299,208 B1
(45) Date of Patent: Nov. 20, 2007

(54) APPARATUS AND SYSTEM FOR DEFINING AN AUTOMATED SPREAD TRADING PARAMETER

(75) Inventors: Leoncio H. Bailon, Livingston, NJ (US); Chengteng Zhang, Jersey City, NJ (US)

(73) Assignee: Goldman Sachs & Co., New York, NY (US)

( * ) Notice: Subject to any disclaimer, the term of this patent is extended or adjusted under 35 U.S.C. 154(b) by 1358 days.

(21) Appl. No.: 10/117,319

(22) Filed: Apr. 5, 2002

(51) Int. Cl.
*G06Q 40/00* (2006.01)
(52) U.S. Cl. .................. 705/37; 705/35; 705/36 R
(58) Field of Classification Search ............ 705/10–42
See application file for complete search history.

(56) References Cited

U.S. PATENT DOCUMENTS

| | | | |
|---|---|---|---|
| 5,812,987 A * | 9/1998 | Luskin et al. ............. | 705/36 R |
| 6,408,282 B1 * | 6/2002 | Buist ........................ | 705/36 R |
| 6,493,682 B1 * | 12/2002 | Horrigan et al. .......... | 705/36 R |
| 6,519,574 B1 * | 2/2003 | Wilton et al. ................. | 705/35 |

FOREIGN PATENT DOCUMENTS

WO    WO 02/059711 A2 *  8/2002

\* cited by examiner

*Primary Examiner*—Frantzy Poinvil
(74) *Attorney, Agent, or Firm*—Buckley, Maschoff & Talwalkar LLC

(57) ABSTRACT

According to one embodiment, an apparatus includes a communication device adapted to communicate with a trader device via a temporary communication channel (e.g., via a Web site). The apparatus may receive from the trader device a trading parameter for a pair of associated investments and store the parameter for subsequent use (e.g., to automatically generate orders in accordance with a spread trading strategy).

31 Claims, 11 Drawing Sheets

| CLIENT IDENTIFIER 702 | NAME 704 | ADDRESS 706 | PAYMENT IDENTIFIER 708 | LIMIT 710 | CURRENT AMOUNT 712 |
|---|---|---|---|---|---|
| ABC | AMERICAN BUSINESS CORP. | 11 MAIN STREET; NEW YORK, NY | 1111-2222-3333-4444 | $50K | $12K |
| NBI | NATIONAL BUSINESS, INC. | PO BOX 100; WASHINGTON, DC | FIRST BANK ACCOUNT NO. 12341234 | $100K | $0 |
| SMT | ROBERT SMITH | 100 WEST ROAD; DALLAS, TX | 1234-1234-1234-1234 | $10K | $9.5K |

| TRADER IDENTIFIER 802 | CLIENT IDENTIFIER 804 | ACCOUNTS 806 | LIMIT 808 | CURRENT AMOUNT 810 |
|---|---|---|---|---|
| JONES | ABC | JONES-1 | $25K | $12K |
| GREENE | ABC | GREENE-1; GREENE-2 | $25K | $0 |
| T104 | NBI | T104-1 | $10K | $0 |

APPARATUS AND SYSTEM FOR DEFINING AN AUTOMATED SPREAD TRADING PARAMETER

CROSS-REFERENCE TO RELATED APPLICATION

This application is related to U.S. patent application Ser. No. 10/117,715 entitled "Apparatus and System for Providing Automated Spread Trading Transaction Information" and filed concurrently herewith.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to spread trading. In particular, the present invention relates to an apparatus and system for defining an automated spread trading parameter.

BACKGROUND

According to certain types of investment strategies, a trader simultaneously (or nearly simultaneously) purchases and sells associated investment instruments, such as stocks or bonds. In particular, the trader attempts to take advantage of a difference, or "spread," between the prices of the associated instruments. For example, a trader might note that: (i) a first instrument can currently be purchased in a first market for $8.25, and (ii) a second instrument—which is expected to be priced the same as the first instrument—can currently be sold in a second market for $8.27. In this case, the trader would simultaneously purchase the first instrument and sell the second instrument to take advantage of the $0.02 price difference.

There are a number of different types of spread trading strategies. For example, arbitrage trading is associated with differences in price when the same security, currency, or commodity is traded on two or more markets. As another example, index arbitrage trading exploits price differences between stock index futures and underlying stocks.

As still another example, risk arbitrage trading involves a purchase of stock in a company being acquired, referred to as a "target," and a sale of stock in a proposed "acquirer" (e.g., a trader may attempt to profit on an expected rise in the price of the target's shares and drop in the price of the acquirer's shares).

In general, the size of investments that are purchased and sold during spreading trading can be significant (e.g., because the price discrepancies tend to be relatively small). Moreover, spread trading investment strategies are time sensitive (e.g., markets can be expected to quickly correct any price discrepancies). As a result, it may not be practical for a trader to manually monitor investments and place orders based on his or her observations. Instead, a trader establishes a number of trading parameters (e.g., a price difference at which orders should be generated) and have an automated system monitor investments and generate orders as appropriate.

For example, a trader might place a telephone call to an operator associated with an automated trading platform. The trader asks to have the platform monitor particular investments and generate orders based on trading parameters he or she verbally provides to the operator. Such an approach, however, may be inefficient for the trader (as well as for the trading platform), especially if the trader frequently adjusts the trading parameters (e.g., based on market conditions). Moreover, such an approach may lead to mistakes (e.g., the operator may incorrectly enter one or more parameters into the trading platform system).

As another approach, a trader might install a hard-wired computer communication channel to the automated trading platform (e.g., by leasing a dedicated access T1 line). A dedicated communication channel, however, can be expensive to install and maintain. As a result, this approach may not be feasible for traders who perform a only a limited amount of spread trading. In addition, the automated trading platform will only be able to accommodate a limited number of traders (e.g., based on a maximum number of dedicated lines that can be received by the platform).

SUMMARY

To alleviate problems inherent in the prior art, the present invention introduces an apparatus and system for defining an automated spread trading parameter.

According to one embodiment, a processor is coupled to a communication device adapted to communicate with a trader device via a temporary computer communication channel. A storage device in communication with the processor stores instructions adapted to be executed by the processor to (i) receive from the trader device a trading parameter for a pair of associated investments and (ii) store the received trading parameter for use by an automated spread trading system.

According to another embodiment, a trading parameter for a pair of associated investments is received from a trader device via a temporary computer communication channel. The received trading parameter is then stored for use by an automated spread trading system.

According to another embodiment, a trading parameter for a pair of associated investments is received from a trader device via a communication channel potentially accessible by a plurality of unrelated trader devices. The received trading parameter is then stored for use by an automated spread trading system.

According to another embodiment, a trading parameter for a pair of associated investments is received via a public computer communication network. The received trading parameter is then stored for use by an automated spread trading system.

According to still another embodiment, a trader identifier is received via a Web site and verified. The following information is then received via the Web site: an acquirer stock identifier, a target stock identifier, a selected risk arbitrage trading strategy, and an authorization to automatically generate orders in accordance with the strategy. The received information is then stored for use by an automated spread trading system.

According to yet another embodiment, a temporary computer communication channel is established with an automated spread trading system. A trading parameter for a pair of associated investments is then transmitted via the communication channel.

One embodiment comprises: means for receiving from a trader device a trading parameter for a pair of associated investments, the receiving being performed via a temporary computer communication channel; and means for storing the received trading parameter for use by an automated spread trading system.

Another embodiment comprises: means for receiving from a trader device a trading parameter for a pair of associated investments, the receiving being performed via a communication channel potentially accessible by a plurality of unrelated trader devices; and means for storing the received trading parameters for use by an automated spread trading system.

Another embodiment comprises: means for receiving from a trader device a trading parameter for a pair of associated investments, the receiving being performed via a public computer communication network; and means for storing the received trading parameters for use by an automated spread trading system.

Still another embodiment comprises: means for receiving a trader identifier via a Web site; means for verifying the trader identifier; means for receiving via the Web site an acquirer stock identifier, a target stock identifier, a selected risk arbitrage trading strategy, and an authorization to automatically generate orders in accordance with the strategy; and means for storing the received information for use by an automated spread trading system.

Yet another embodiment comprises: means for establishing a temporary computer communication channel with an automated spread trading system; and means for transmitting via the communication channel a trading parameter for a pair of associated investments.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 8 is a tabular representation of a portion of a trader database according to one embodiment of the present invention.

DETAILED DESCRIPTION

Figure 1:
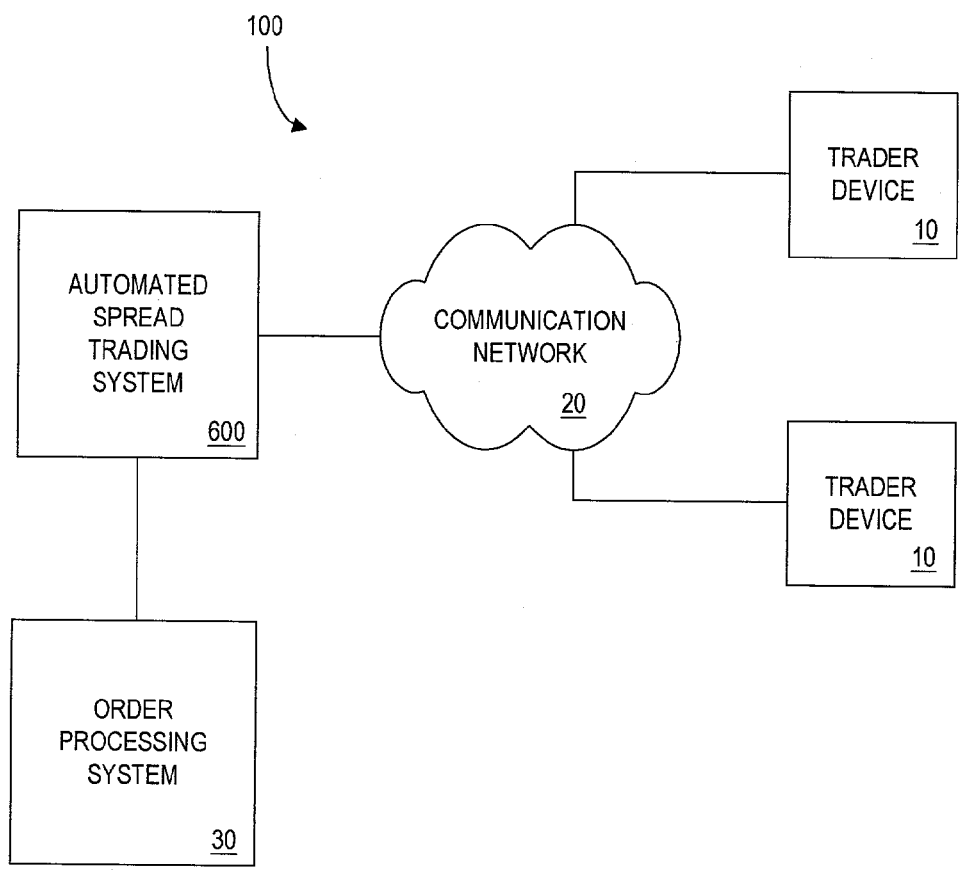
FIG. 1 is a block diagram overview of a trading environment according to some embodiments of the present invention.

FIG. 1 is a block diagram of a trading environment 100 according to some embodiments of the present invention. The trading environment 100 includes an automated spread trading system 600 in communication with a number of trader devices 10 and an order processing system 30.

The automated spread trading system 600, the trader devices 10, and the order processing system 30 may comprise any devices capable of performing the various functions described herein. For example, a trader device 10 may be a Personal Computer (PC) associated with a "trader." As used herein, the term "trader" may refer to, for example, an individual or other entity that buys and sells investments (e.g., securities, stocks, bonds, options, or commodities). A trader device 10 may also comprise a portable computing device such as a laptop computer, a Personal Digital Assistant (PDA), a wired or wireless telephone, or any other appropriate storage and/or communication device.

The automated spread trading system 600 may be, for example, a Web server adapted to exchange information with trader devices 10 and/or the order processing system 30. As used herein, devices (e.g., the automated spread trading system 600 and the trader devices 10) may communicate, for example, via a communication network 20, such as an Internet Protocol (IP) network (e.g., the Internet). Note that the communication network 20 can also include a number of different networks, such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, the automated spread trading system 600 communicates with the trader device 10 via a temporary computer communication channel (e.g., a path through which information can be exchanged). In other words, the communication channel between the automated spread trading system 600 and a trader device 10 may be established and discontinued as appropriate. Note that an established communication channel does not need to be associated with a particular physical path. For example, the automated spread trading system 600 may exchange information with a trader device 10 via a Web site, in which case packets of information may be transmitted via various physical paths.

According to other embodiments, the automated spread trading system 600 communicates with the trader device 10 via a public computer communication network. That is, at least a portion of the communication network may be accessed by devices other than the automated trading system 600 and the trader device 10. Note, however, that the information exchanged between the automated trading system 600 and the trader device 10 could be encrypted or otherwise protected to prevent a third party from accessing (i.e., understanding) the information.

According to still other embodiments, the automated spread trading system 600 communicates with the trader device 10 via a computer communication channel that is potentially accessible by a plurality of unrelated trader devices 10. For example, a single port or line associated with the automated spread trading system 600 might communicate with a first trader device 10 for a period of time and then with a second, unrelated trader device 10 (i.e., the first and second trader devices 10 may be associated with different traders or clients).

Although a single automated spread trading system 600 is shown in FIG. 1, any number of these devices may be included in the trading environment 100. Similarly, any number of trader devices 10, order processing systems 30, or any other device described herein may be included in the trading environment 100 according to embodiments of the present invention.

The order processing system 30 may be, for example, a trade platform that arranges for orders to be executed based on information received from the automated spread trading system 600. For example, the order processing system 30 may arrange for buy and sell orders to be executed via a market center or public exchange (e.g., the New York Stock Exchange). The order processing system 30 may be associated with, for example, a Web server or third-party order processing service.

Note that some of devices illustrated in FIG. 1 may actually be incorporated in a single device. For example, the automated spread trading system 600 may also act as an order processing system 30.

According to an embodiment of the present invention, the automated spread trading system 600 receives from a trader device 10 one or more trading parameters for a pair of associated investments. For example, the automated spread trading system 600 might receive stock identifiers associated with an acquirer and a target (e.g., "GE" and "HON"). The automated spread trading system 600 might also receive an indication of a trading strategy (e.g., associated with a particular risk arbitrage trading strategy). The automated spread trading system 600 may then store the received trading parameters.

Figure 2:
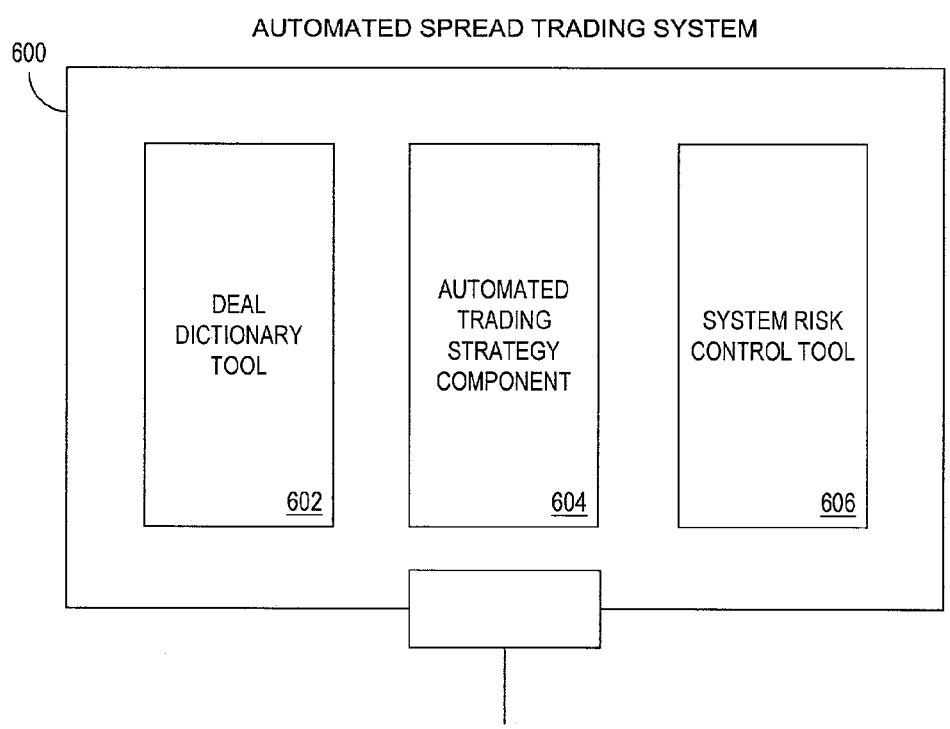
FIG. 2 is a block diagram overview of an automated spread trading system according to some embodiments of the present invention.

FIG. 2 is a block diagram overview of the automated spread trading system 600 according to some embodiments of the present invention. As can be seen, the automated spread trading system 600 includes a deal dictionary tool 602 (e.g., an investment pair setup tool). The deal dictionary tool 602 may comprise, for example, an application or engine that exchanges information with a trader device 10. The deal dictionary tool 602 helps a trader set up one or more deals (e.g., each deal being associated with a pair of investments). In particular, the deal dictionary tool 602 may let the trader establish trading parameters for the deal. Note that some or all of the functions described with respect to the deal dictionary tool 602 may instead be performed at a trader device 10.

According to one embodiment, a trader selects one or more trading strategies associated with a risk arbitrage deal. For example, a trader might select limits, distribution, dollar-to-dollar, share-to-share, and/or order-for-order trading strategies. According to another embodiment, the trader selects a strategy for a deal associated with fixed income investments (e.g., government, corporate, or municipal bonds). For example, the trader might define a spread between two treasury investments (e.g., treasury bills, notes, or bonds) at which buy and sell orders should be automatically generated. According to another embodiment, the trader selects a strategy associated with two baskets of investment instruments (e.g., two mutual funds) that are somehow statistically related.

In the case of a risk arbitrage deal, the trading parameters defined via the deal dictionary tool 602 might include information about a potential acquirer, such as a stock name, a dividend amount, a sell action (e.g., "sell long only," "sell short only" or a "mixed" sell action indicating that the action type should be determined by an actual position share number in an account), and/or an indication that orders should only be generated in "round lots" (i.e., generally accepted units of trading). Other information may indicate whether the automated spread trading system 600 should initiate orders of a target stock. Similar information about a potential target may also be defined via the deal dictionary tool 602.

Other trading parameters for the deal might include a ratio value (e.g., a value indicating a share converting ratio), a spread ration (e.g., a dollar spread discussed below), a cash value (e.g., a value indicating a converting cash amount), a cash balance, a hedge type (e.g., options of hedge for dollar and hedge for share), and a hedge ratio (e.g., which may default to a spread ration for dollar hedge but not for share hedge). Similarly, the trader may define a maximum position, such as a maximum target position share amount that will limit the trader's stake in the deal. The trader may also define a percent per tick value reflecting a percent of maximum target position shares per "tick" (e.g., an upward or downward price movement) to be applied on pair initiate orders.

According to some embodiments, the trading parameters may include a setup limit (e.g., a sell spread limit dollar or percentage amount) and a setup position, such as a maximum setup target position associated with selling an acquirer investment and purchasing a target investment (e.g., a dollar value for a dollar hedge or a share value for a share hedge). Similarly, the trading parameters may include a setup position per order (e.g., an initiating order share number or dollar value depending on the associated hedge type).

Moreover, the trading parameters might include an unwind limit (e.g., a buy spread limit dollar or percentage amount) and an unwind position, such as a maximum unwind target position associated with selling a target investment and purchasing an acquirer investment (e.g., a dollar value for a dollar hedge or a share value for a share hedge). Similarly, the trading parameters may include an unwind position per order (e.g., an initiating order share number or dollar value depending on the associated hedge type).

The deal dictionary tool 602 may also be used to establish a quote range (e.g., in dollars), an order time interval (e.g., a time constraint between consecutive orders that are initiated), and/or a sell short constraint which may be applicable for trading strategies that allow both sell and buy initiate orders (e.g., dollar-to-dollar limits).

Moreover, the deal dictionary tool 602 may be used to define a strategy (e.g., a limit or distribution strategy), a spread type (e.g., a dollar, yield, or yield close spread type), a cancel/replace increment (e.g., when the limit price of an initiate order moves above a dollar amount the automated spread trading system 600 may send a cancel/replace order with a new limit price), a liquidity constraint (e.g., in terms of percentage of current open size of other side), a short tick allowance (e.g., adjustment of spread limits for setup and unwind if the price type of balance order is sell short), a balance buy type (e.g., price type of balance buy order), a balance sell type (e.g., a price type of balance sell order), a buy offset (e.g., an adjustment of limit price of balance buy order), a sell offset (e.g., an adjustment of limit price of balance sell order), a balance order unit, and/or a balance order multiplier.

In the case of a dollar spread, an upper limit (e.g. a sell spread limit in dollars) and a lower limit (e.g., a buy spread limit in dollars) may be defined. For example, a "bid spread" may be defined as:

$$\text{spread-}BB=(A_{bid}-A_{div})*\text{ratio}+\text{cash}-(T_{bid}-T_{div})$$

where $A_{bid}$ is associated with an acquirer bid, $A_{div}$ is associated with an acquirer dividend, $T_{bid}$ is associated with a target bid, and $T_{div}$ is associated with a target dividend. Similarly, an "ask spread" may be defined as:

$$\text{spread-}AA=(A_{ask}-A_{div})*\text{ratio}+\text{cash}-(T_{ask}-T_{div})$$

Moreover, a "bid-ask spread" and an "ask-bid spread" may be defined as, respectively:

$$\text{spread-}BA=(A_{bid}-A_{div})*\text{ratio}+\text{cash}-(T_{ask}-T_{div})$$

$$\text{spread-}AB=(A_{ask}-A_{div})*\text{ratio}+\text{cash}-(T_{bid}-T_{div})$$

and a "last spread" may be defined as:

$$\text{spread-}LL=(A_{last}-A_{div})*\text{ratio}+\text{cash}-(T_{last}-T_{div})$$

In the case of a yield spread, these values may instead be defined as follows:

$$\text{spread-}BB=(A_{bid}/T_{bid})*100$$

$$\text{spread-}AA=(A_{ask}/T_{ask})*100$$

$$\text{spread-}BA=(A_{bid}/T_{ask})*100$$

$$\text{spread-}AB=(A_{ask}/T_{bid})*100$$

$$\text{spread-}LL=(A_{last}/T_{last})*100$$

In the case of a yield close spread, the values may be defined as:

$$\text{spread-}BB=((A_{bid}/A_{close})-(T_{bid}/T_{close}))*100$$

$$\text{spread-}AA=((A_{ask}/A_{close})-(T_{ask}/T_{close}))*100$$

$$\text{spread-}BA=((A_{bid}/A_{close})-(T_{ask}/T_{close}))*100$$

$$\text{spread-}AB=((A_{ask}/A_{close})-(T_{bid}/T_{close}))*100$$

$$\text{spread-}LL=((A_{last}/A_{close})-(T_{last}/T_{close}))*100$$

The automated spread trading system 600 also includes an automated trading strategy component 604. The automated trading strategy component 604 may comprise, for example, one or more agents that use trading parameters associated with a deal and market information to determine if buy and/or sell orders should be automatically generated. That is, following a trading strategy selected by the trader, the automated trading strategy component 604 may control the initial order process and manage existing open orders. Note that the automated trading strategy component 604 may receive market data and trading information (e.g., associated with open orders and positions) in substantially real-time and process the data to issue subsequent orders based on trading parameters. The order messages may then be transmitted to the order processing system 30 for eventual execution.

In the case of a limits trading strategy, sell orders may be triggered when pre-determined offer prices (e.g., calculated using spread limits and ask prices of the opposite side in the deal) are above, at, or lower than the current ask price as appropriate. In particular, the pre-determined offer prices for selling the acquirer stock and selling the target stock may be defined as, respectively:

$$A_{offer}=((T_{ask}-T_{div})+\text{Upper Limit}-\text{cash})/\text{ratio and}$$

$$T_{offer}=(A_{ask}-T_{div})*\text{ratio}+\text{cash}-\text{Lower Limit}.$$

Note that the calculated prices may be rounded-off as desired. When $A_{offer}$ is less than or equal to ($A_{ask}$+Quote Range) or $B_{offer}$ is less than or equal to ($T_{ask}$+Quote Range), a sell order is generated by the automated trading strategy component 604. Note that ambiguous sale decisions could result if the separation between spread limits is defined as less than 2*Quote Range.

According to one embodiment, the automated trading strategy component 604 generates a "cancel" request (e.g., indicating that an outstanding order should be cancelled) when the selling condition described above fails. Moreover, when the $A_{offer}/T_{offer}$ price moves away from the last order price, a "cancel and replace" order may be generated to take advantage of the new price.

According to some embodiments of the present invention, the current position balance is monitored. When a sell order on one side is partially filled, the automated trading strategy component 604 can then place a market buy order for a corresponding amount on the opposite side.

The number of shares for each sell order may be set, for example, as the lesser of (i) a trader-defined percentage of a maximum position and (ii) a percentage (e.g., a liquidate constraint) of a current ask size for the balance side.

According to some embodiments, the automated trading strategy component 604 imposes a time delay: (i) between two orders on the same investment instrument and/or (ii) between a balancing order and a subsequent initiating order. By way of example, the time delay could be twenty four seconds or another value defined by a trader via the deal dictionary tool 602.

Consider now a "distribution" trading strategy to be used when a trader wants to maintain positions at different spreads for a particular deal. For example, such a strategy might utilize a distribution file that can be modified by the trader in substantially real time. Table I illustrates values for a such a distribution file:

TABLE I

Distribution File Illustration

| Deal Identifier | Desired Acquire Position | Spread |
|---|---|---|
| AOL_TWX | −5,000 | above 3.0 |
| AOL_TWX | −3,000 | 2.5 to 3.0 |
| AOL_TWX | −1,000 | 2.0 to 2.5 |
| AOL_TWX | 0 | 1.5 to 2.0 |
| AOL_TWX | 2,000 | 1.0 to 1.5 |
| AOL_TWX | 5,000 | below 1.0 |

Now assume that (i) the current ask-spread (e.g., the difference between the last ask prices of "AOL" shares and "TWX" shares) is 1.7 and (ii) the trader does not have any position in the account. Since the spread is currently between 1.5 and 2.0, the target position is "0" shares.

When the current ask-spread moves above 2.0, the desired position now becomes "−1,000." The automated trading strategy component 604 sells spread (i.e., sells AOL shares and buys TWX shares) until the desired position is reached (i.e., "−1,000" shares).

When the current ask-spread moves back below 2.0, the desired position again becomes "0." The automated trading strategy component 604 buys spread (i.e., sells TWX shares and buys AOL shares) until the desired position is reached (i.e., "0" shares).

Referring again to FIG. 2, the automated spread trading system 600 also includes a system risk control tool 606. The system risk control tool 606 may, for example, let a trader, a client, and/or an operator associated with the automated spread trading system 600 establish various trading activity constraints. For example, the system risk control tool 606 might halt trading for a specific deal or an entire account when a constraint is exceeded. Similarly, an order might only be generated when time, size, dollar, liquidity, and/or system availability parameters are met.

The constraint parameters monitored by the system risk control tool 606 may include, for example, a maximum share amount or dollar position for each deal, a maximum open order share amount or dollar amount for each deal, and/or a maximum number of open orders for each deal. Similarly, the system risk control tool 606 might monitor these parameters on an account basis (e.g., reflecting a number of different deals). As another example, the system risk control tool 606 might ensure that a limit order price is within a predetermined range of a current market price.

According to one embodiment, a risk parameters is automatically determined based on trader information. For example, all traders associated with a particular client may be assigned a particular risk parameter (e.g., a $10,000 trading limit). According to another embodiment, a system operator provides the risk parameter which is then stored for use by the system risk control tool 606.

According to another embodiment, the system risk control tool 600 also verifies system information. For example, if a component crashes or improper messages are detected, the system risk control tool 606 could automatically halt trading for investments that might be associated with the problem.

Trading System Method

Figure 3:
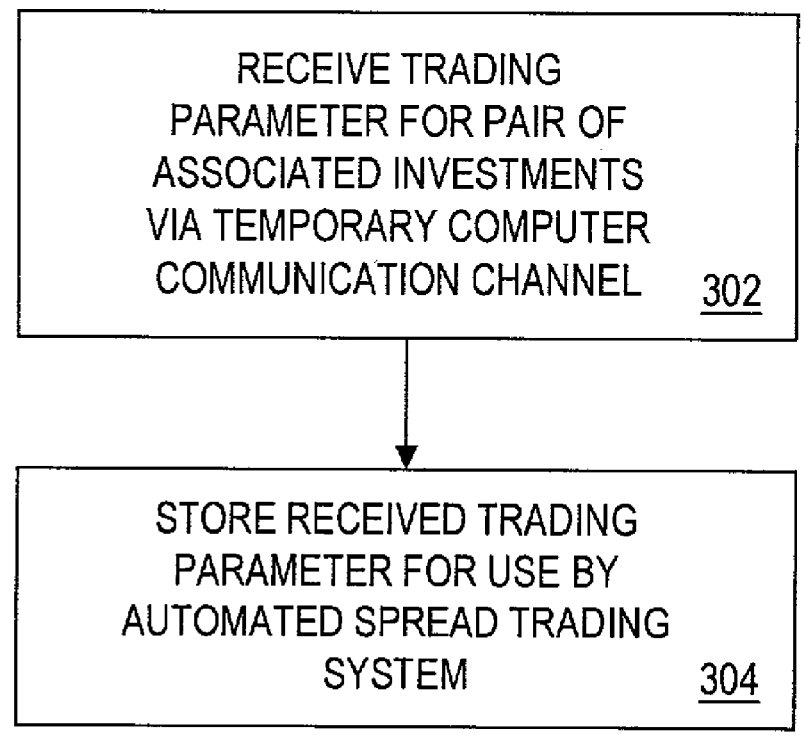
FIG. 3 is a flow chart of a method according to some embodiments of the present invention.

FIG. 3 is a flow chart of a method that may be performed by the automated spread trading system 600 according to some embodiments of the present invention. The flow charts described herein do not imply a fixed order to the steps, and embodiments of the present invention may be practiced in any order that is practicable.

At 302, a trading parameter for a pair of associated investments is received from a trader device 10 via a temporary computer communication channel. For example, the automated spread trading system 600 may receive the trading parameter via a Web site. The pair of investments may be associated, for example, because they have been selected by the trader and/or because of an underlying statistical relationship (or perceived statistical relationship). According to some embodiments, a trading parameter may be associated with more than two investments (e.g., a trader might define a deal associated with three or more investments). The information received by the automated spread trading system 600 might include, for example, a trader identifier, a trader device identifier, a client identifier, and/or an account identifier.

According to one embodiment, the automated spread trading system 600 receives a trading parameter associated with risk arbitrage trading, and the pair of associated investments comprise an acquirer stock and a target stock. According to another embodiment, at least one of the investments is associated with a plurality of investments (e.g., one investment might be a mutual fund). According to still another embodiment, the received trading parameter is associated a fixed income trading strategy.

Figure 4:
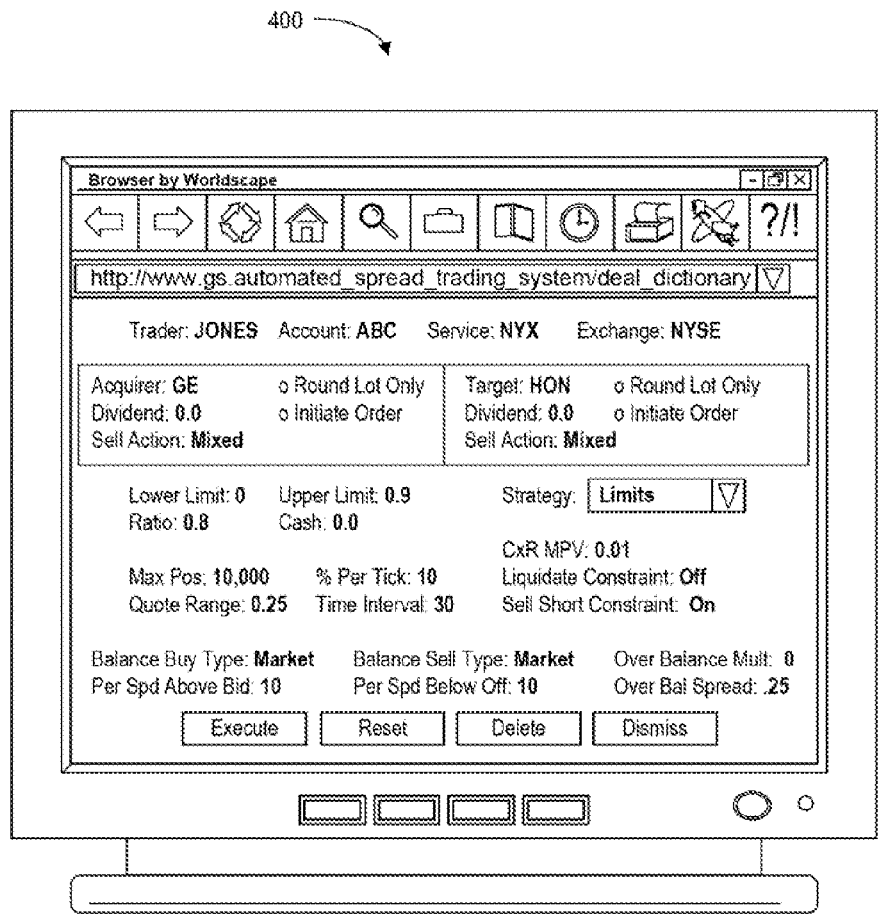
FIG. 4 illustrates a deal dictionary display according to some embodiments of the present invention.

FIG. 4 illustrates a deal dictionary display 400 (e.g., displayed via a trader device 10) according to some embodiments of the present invention. In particular, the display 400 comprises a Graphical User Interface (GUI) that a trader can use to define stock pairs and other trading parameters for a risk arbitrage deal. The display 400 may be generated by, for example, a JAVA™ applet transmitted from the automated spread trading system 600 to the trader device 10. According to another embodiment, the trader instead defines one or more trading parameters by exporting or otherwise providing information from another application (e.g., a MICROSOFT EXCEL® spreadsheet).

As can be seen in FIG. 4, the trading parameter defined via the display 400 can include one or more investment identifiers (e.g., stock identifies associated with the acquirer and the target). According to some embodiments, the trader may also define a deal identifier (e.g., "GE_HON" not shown in FIG. 4). The information may also include a service and/or an exchange associated with the deal (e.g., "NYX" and "NYSE," respectively).

For each of the acquirer and target investments, the trader may further define a dividend value, a sell action (e.g., "mixed"), a round lot indication (e.g., indicating that orders should only be generated for round lots, and/or an order initiation indication. Other trading parameters that may be established via the display 400 include a lower limit, an upper limit, a ratio, and/or a cash value.

The trader may also define a trading strategy associated with the pair of investments, such as a follow spread strategy, a distribution strategy, a dollar-to-dollar strategy, a share-to-share strategy, and/or an order-for-order strategy.

As can be seen in FIG. 4, the display 400 may also be used to establish one or more of the following trading parameters: a Minimum Price Variation (MPV), a maximum position, a percent per tick, a liquidate constraint, a quote range, a time interval, a sell short constraint, a balance buy type, a balance sell type, an over balance multiple, a per spread above bid, a per spread below offer, and/or an over balance spread.

The trader may also activate areas on the display to indicate that the deal should executed, reset (e.g., returned to default values), deleted, or dismissed.

Figure 5:
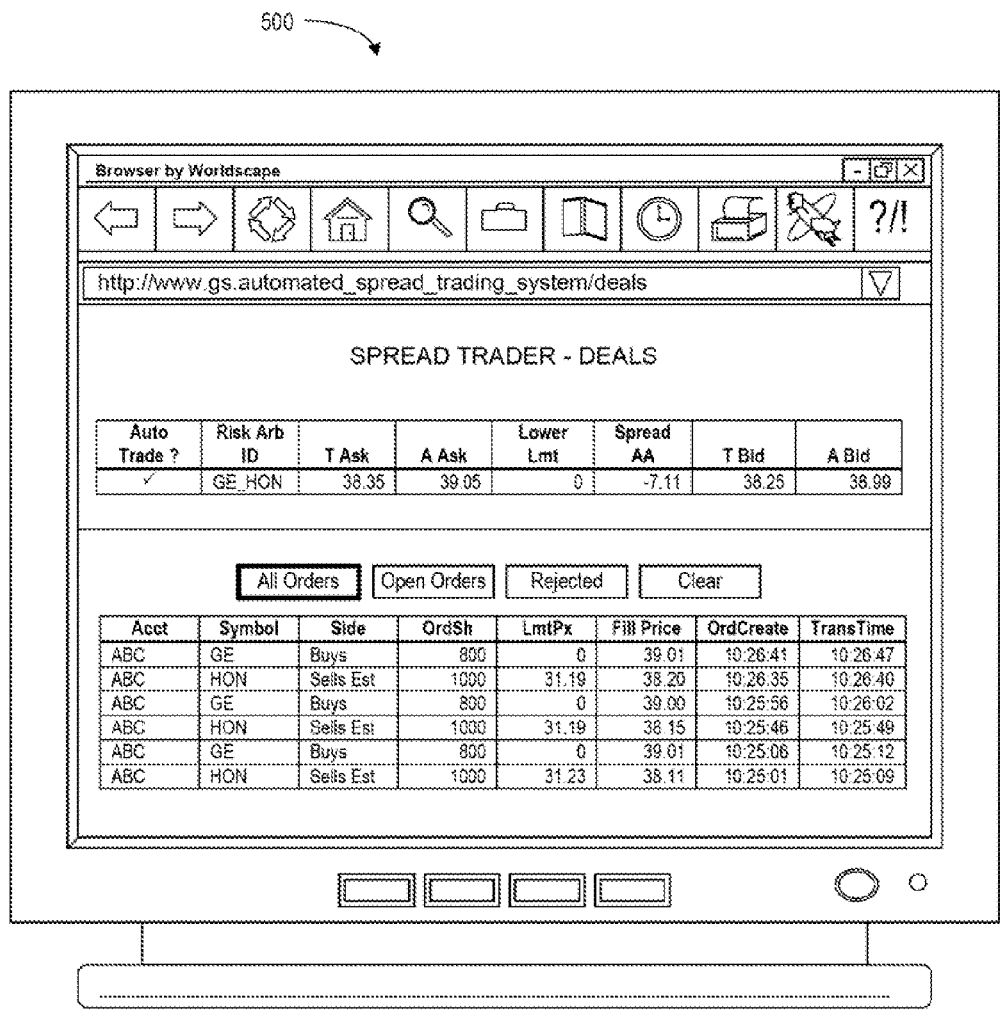
FIG. 5 illustrates a deals display according to some embodiments of the present invention.

FIG. 5 illustrates a deals display 500 according to some embodiments of the present invention. In particular, the display 500 is providing information about a single risk arbitration deal (i.e., having an identifier of "GE_HON"). Note that the deals display 500 could provide information about a number of different deals defined by a trader.

For each deal, the deals display indicates whether or not orders are being automatically generated (i.e., as indicated by a check mark). The trader may activate this area to select and de-select this indication to authorize the automatic generation of orders in accordance with the strategy he or she selected via the deal dictionary tool 602. According to one embodiment, the automated spread trading system 600 automatically cancels any outstanding orders associated with a deal when this indication is deselected.

For each deal, the deal display 500 displays a target and acquirer asking price, a lower limit, an ask spread, a target bid, and an acquirer bid. Moreover, other information about each deal could be displayed. For example, for each deal some or all of the following information might be provided: a target bid, an acquirer bid, a last target value, and a last acquirer value.

The lower portion of the display 500 may provide information about all orders (e.g., including orders that have been executed), open orders, or rejected orders as selected by the trader. In particular, for each order the following information is provided: an account identifier, a stock symbol, the side of the order (e.g., buy or sell), the number of shares associated with the order, a price associated with the order (e.g., a limit price and average price), and a time associated with the order (e.g., the time the order was created and the time the transaction was executed). Moreover, other information about each order could be displayed, such as: an order dollar amount, an order lot size, a number of shares that have been filled, and/or a number of shares that remain open. The trader may also select to clear the order portion of the display 500.

The information on the deals display 500 may be updated in substantially real time (e.g., once every second). Note that different portions of the deals display 500 may be updated at different rates. Moreover, the deals display 500 might provide information on an account, a trader, a client, and/or a system basis.

In addition to the trading parameters described with respect to FIGS. 4 and 5, other information could be defined for a deal (e.g., via the deal dictionary tool 602), such as: a date, a time (e.g., indicating that orders should be automatically generated until 2:00 PM), a duration (e.g., indicating that orders should be automatically generated for the next three hours), start information, and/or end information (e.g., a trigger that will halt the automatic generation of orders). According to another embodiment, the trader may define an alternate communication address independent of the temporary computer communication channel. For example, the trader might provide a telephone number or an electronic mail address that should be used to contact the trader when a defined trigger is satisfied.

At 304, the received trading parameter is stored for use by the automated spread trading system 600. For example, the automated spread trading system 600 may locally store the trading parameter in a database. The trading parameter may be stored in association with, for example, a particular trader, a client associated with a plurality of traders, and/or one of a plurality of accounts associated with a trader. Note that the trading parameter may still be stored after the temporary computer communication channel is discontinued. For example, a set of trading parameters might be stored even after a trader leaves a Web site. In this way, orders can be automatically generated when the trader is not currently in communication with the automated spread trading system 600.

Automated Spread Trading System

Figure 6:
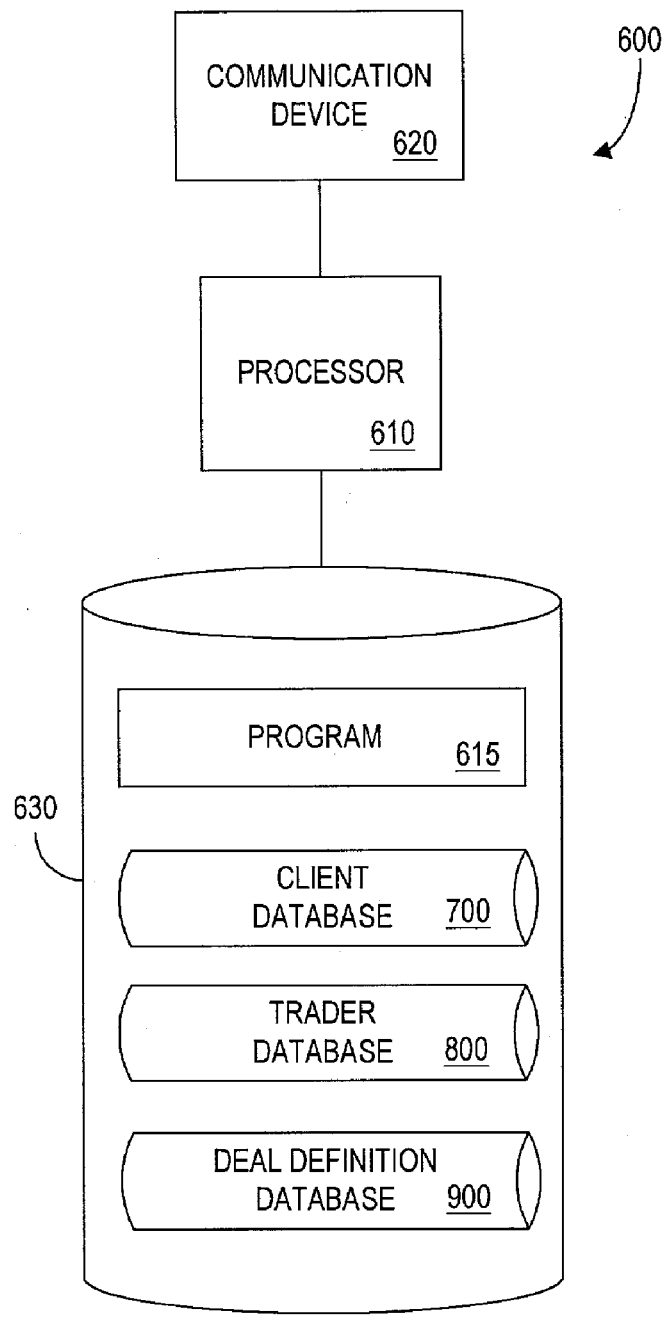
FIG. 6 is a block diagram of an automated spread trading system according to one embodiment of the present invention.

FIG. 6 illustrates an automated spread trading system 600 that is descriptive of the device shown, for example, in FIGS. 1 and 2 according to an embodiment of the present invention. The automated spread trading system 600 comprises a processor 610, such as one or more INTEL® Pentium® processors, coupled to a communication device 620 configured to communicate via, for example, (i) a temporary computer communication channel, (ii) a computer communication channel potentially accessible by a number of unrelated trader devices 10, (iii) a public computer communication network, and/or (iv) any other type communication channel or network. The communication device 620 may be used to communicate, for example, with one or more trader devices 10 and order processing systems 30. According to one embodiment, the communication device 620 is also used to communicate with other automated spread trading systems.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 stores a program 615 for controlling the processor 610. The processor 610 performs instructions of the program 615, and thereby operates in accordance with the present invention. For example, the processor 610 may receive from a trader device 10 a trading parameter for a pair of associated investments. The processor 610 may then store the received trading parameter for subsequent use.

According to one embodiment, the processor 610 receives a trader identifier via a Web site and verifies the trader identifier. The processor 610 then receives the following information via the Web site: an acquirer stock identifier, a target stock identifier, a selected risk arbitrage trading strategy, and an authorization to automatically generate orders in accordance with the strategy. This information is then stored by the processor 610 for subsequent use.

As used herein, information may be "received" by or "transmitted" to, for example: (i) the automated spread trading system 600 from a trader device 10 or an order processing system 30; or (ii) a software application or module within the automated spread trading system 600 from another software application, module, or any other source.

Figure 9:
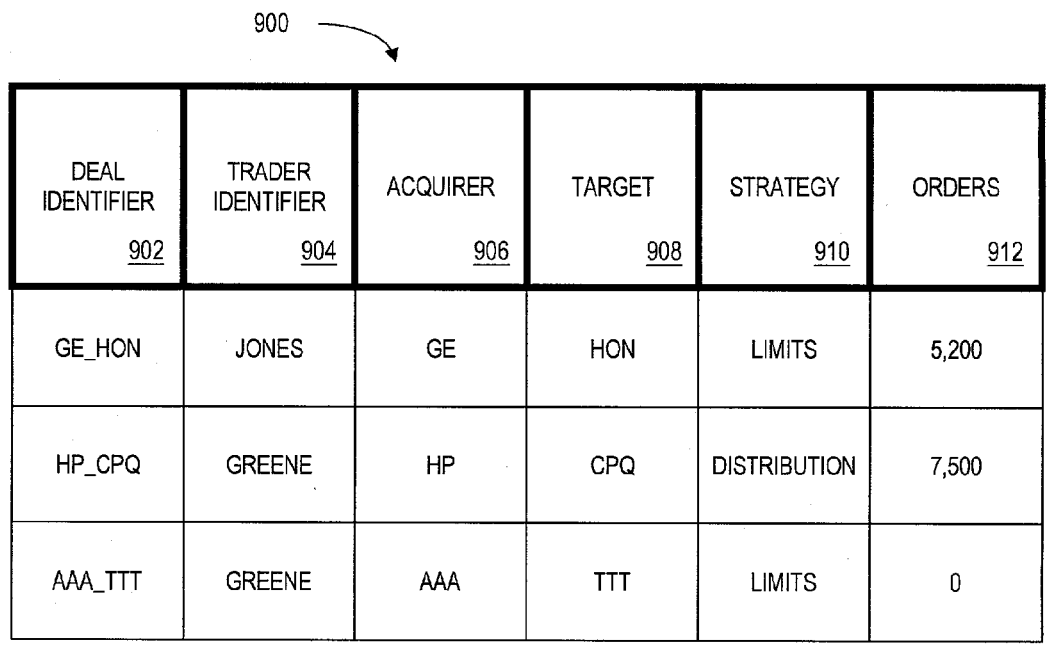
FIG. 9 is a tabular representation of a portion of a deal definition database according to one embodiment of the present invention.

As shown in FIG. 6, the storage device 630 also stores: a client database 700 (described with respect to FIG. 7); a trader database 800 (described with respect to FIG. 8); and a deal definition database 900 (described with respect to FIG. 9). Examples of databases that may be used in connection with the trading environment 100 will now be described in detail with respect to FIGS. 7 through 9. The illustrations and accompanying descriptions of the databases presented herein are exemplary, and any number of other database arrangements could be employed besides those suggested by the figures.

Client Database

Figure 7:
FIG. 7 is a tabular representation of a portion of a client database according to one embodiment of the present invention.

Referring to FIG. 7, a table represents the client database 700 that may be stored at the automated spread trading system 600 according to an embodiment of the present invention. The table includes entries identifying clients that may define deals via the trading environment 100. The table also defines fields 702, 704, 706, 708, 710, 712 for each of the entries. The fields specify: a client identifier 702, a name 704, an address 706, a payment identifier 708, a limit 710, and a current amount 712. The information in the client database 700 may be created and updated, for example, based on information received from trader devices 10 and/or an operator associated with the automatic spread trading system 600.

The client identifier 702 may be an alphanumeric code associated with a particular client. The name 704 and address 706 indicate the name and address of the client, respectively, and the payment identifier 708 may be, for example, a credit card or bank account number used to exchange payments with the client. The limit 710 may be a maximum dollar position associated with the client, and the current amount 712 may indicate the client's current dollar position.

Trader Database

Referring to FIG. 8, a table represents the trader database 800 that may be stored at the automated spread trading system 600 according to an embodiment of the present invention. The table includes entries identifying traders that may define deals via the trading environment 100. The table also defines fields 802, 804, 806, 808, 810 for each of the entries. The fields specify: a trader identifier 802, a client identifier 804, accounts 806, a limit 808, and a current amount 810. The information in the trader database 800 may be created and updated, for example, based on information received from trader devices 10 and/or an operator associated with the automatic spread trading system 600.

The trader identifier 802 may be an alphanumeric code associated with a particular trader (e.g., a user name and/or password). The client identifier 804 indicates a client associated with the trader and may be based on, or associated with, the client identifier 702 stored in the client database 700. For example, as illustrated by the first two entries in FIG. 8, the trader identified as "Jones" and the trader identified as "Greene" are both associated with a single client (i.e., identified as "ABC").

The accounts 806 indicate one or more accounts associated with that trader. The limit 808 may be a maximum dollar position associated with the trader, and the current amount 810 may indicate the trader's current dollar position.

Deal Definition Database

Referring to FIG. 9, a table represents the deal database 900 that may be stored at the automated spread trading system 600 according to an embodiment of the present invention. The table includes entries identifying deals that have been defined by traders. The table also defines fields 902, 904, 906, 908, 910, 912 for each of the entries. The fields specify: a deal identifier 902, a trader identifier 904, an acquirer 906, a target 908, a strategy 910, and orders 912. The information in the deal database 900 may be created and updated, for example, based on information received from trader devices 10 and/or an order processing system 30.

The deal identifier 902 may be an alphanumeric code associated with a deal that has been defined by a trader. The trader identifier 904 may indicate the trader who defined the deal and may be based on, or associated with, the trader identifier 802 stored in the trader database 800.

The acquirer 906 and the target 908 indicate a pair of investments associated with the deal. The acquirer 906 and the target 908 may comprise, for example, identifiers associated with a pair of stocks. The strategy 910 may indicate a trading strategy that should be used to automatically generate orders for the deal (e.g., a limits or distribution trading strategy). The orders 912 represent orders that have been automatically generated in accordance with the strategy 910.

Risk Arbitrage Method

Figure 10:
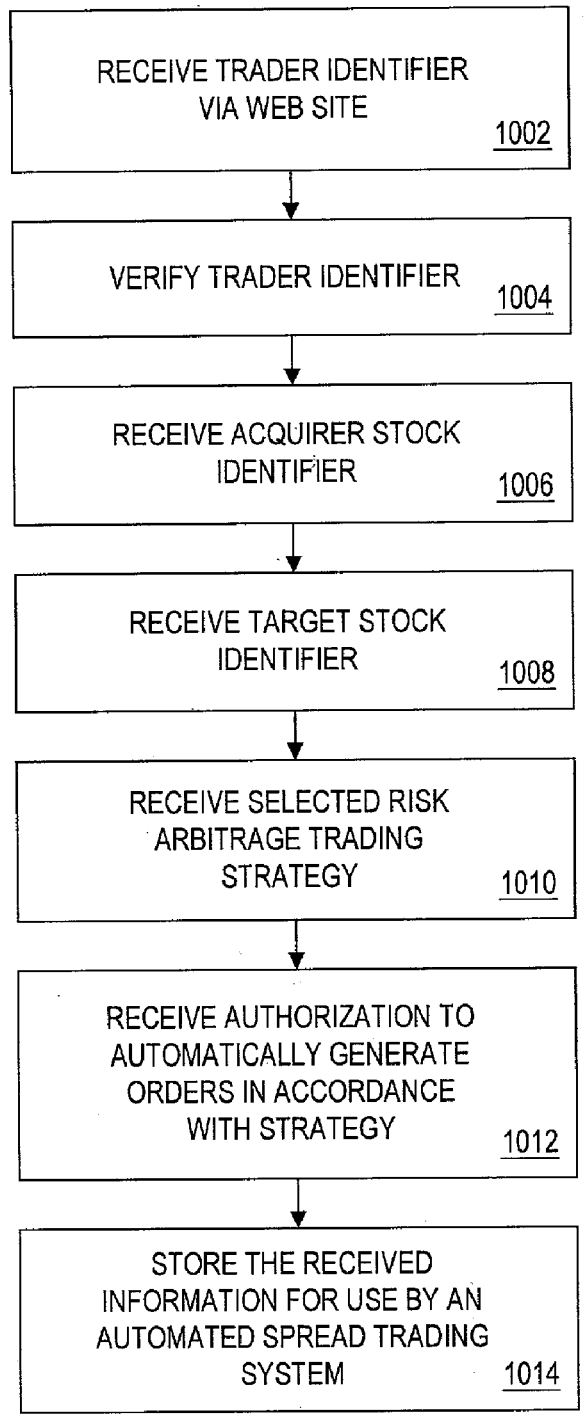
FIG. 10 is a flow chart of a computer-implemented method of facilitating risk arbitrage trading according to some embodiments of the present invention.

FIG. 10 is a flow chart of a computer-implemented method of facilitating risk arbitrage trading according to some embodiments of the present invention. The method may be performed, for example, by the automated spread trading system 600. At 1002, a trader identifier is received via a Web site. For example, a trader may use a trader device 10 to provide a user name and password to a Web site associated with the automated spread trading system 600. At 1004, the trader identifier is verified. For example, the automated spread trading system 600 may verify the trader identifier using information stored in the client database 700 and/or the trader database 800.

An acquirer stock identifier is received at 1006, a target stock identifier is received at 1008, and a selected risk arbitrage trading strategy is received at 1010. For example, the automated spread trading system 600 may receive this information from a trader device 10 via the Web site. An authorization to automatically generate orders in accordance with the strategy is received at 1012. For example, the trader may activate the deal via the deals display 500 described with respect to FIG. 5.

The received information is then stored at 1014 for use by the automated spread trading system 600. For example, the acquirer 906, the target 908, and the strategy 910 in the deal definition database 900 may be updated as appropriate.

Clients, Traders, and Accounts

Figure 11:
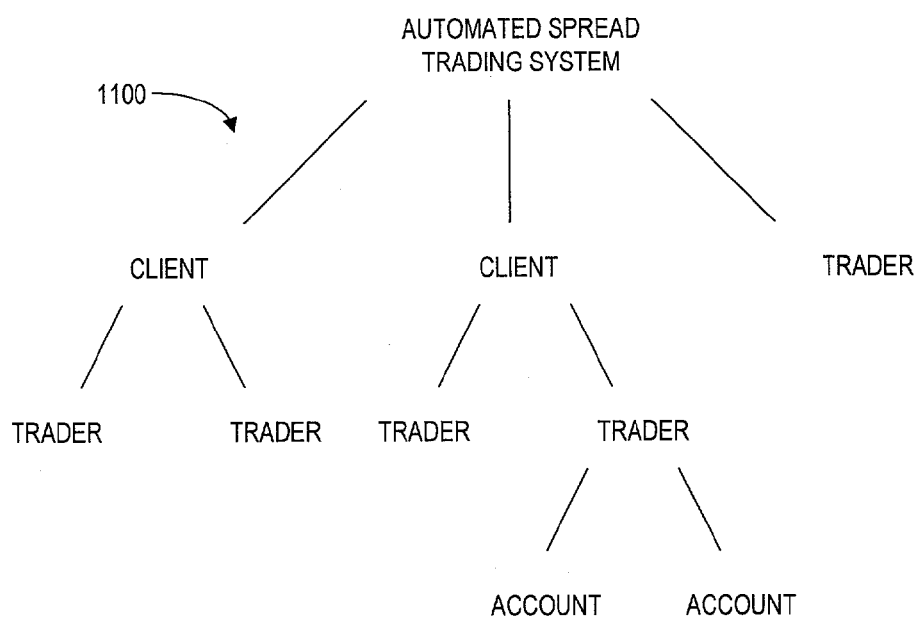
FIG. 11 illustrates a client, trader, and account hierarchy according to some embodiments of the present invention.

FIG. 11 illustrates clients, traders, and accounts according to some embodiments of the present invention. In particular, a hierarchy 1100 illustrates how the automated spread trading system 600 may organize a number of clients, traders, and accounts. Note that a single client may be associated with a number of different traders—and that a single trader may be associated with a number of different accounts.

One or more trading parameters may be stored on a client basis. For example, all deals defined for a client may be associated with a default "limits" trading strategy. Similarly, a trading parameter could be stored on a trader or account basis. Note that the system risk control tool 606 may monitor trading activity on one or more of a client, trader, and/or account level.

ADDITIONAL EMBODIMENTS

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments of the present invention have been described with respect to trading parameters stored at the automated spread trading system 600, according to other embodiments some or all of the trading parameters are instead stored at the trader device 10. For example, default trading parameters may be stored at the trader device 10.

Moreover, according to one embodiment the automated trading strategy component 604 is incorporated into the trader device 10 (e.g., the trader device 10 may receive market information and automatically generate orders based on a trading strategy).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An apparatus, comprising:
   a processor;
   a communication device coupled to said processor and adapted to communicate with a trader device via a temporary computer communication channel; and
   a storage device in communication with said processor and storing instructions adapted to be executed by said processor to:
   receive via the communication device an indication of a first investment from said trader device;
   receive via the communication device an indication of a second investment from the trader device;
   store an association between the first investment and the second investment;
   receive from the trader device a trading parameter to be associated with both the first and second investments, said receiving the trading parameter being performed via the communication device;
   store the received trading parameter, in association with both the first and second investments, for use by an automated spread trading system;
   retrieve the stored trading parameter; and
   transmit the stored trading parameter, via the communication device, to the trader device for display to a trader.

2. The apparatus of claim 1, wherein said storage device further stores at least one of: (i) a client database, (ii) a trader database, or (iii) a deal definition database.

3. The apparatus of claim 1, wherein said communication device is adapted to communicate with at least one of: (i) the trader device, (ii) an order processing system, (iii) an automated spread trading system, (iv) a deal dictionary tool, (v) an automated trading strategy component, or (vi) a system risk control tool.

4. A method to facilitate spread trading, comprising:
receiving from a trader device an indication of a first investment;
receiving from the trader device an indication of a second investment;
storing an association between the first investment and the second investment;
receiving from the trader device a trading parameter to be associated with both the first and second investments, said receiving the trading parameter being performed via a temporary computer communication channel;
storing the received trading parameter, in association with both the first and second investments, for use by an automated spread trading system;
retrieving the stored trading parameter; and
transmitting the stored trading parameter, via the temporary computer communication channel, to the trader device for display to a trader.

5. The method of claim 4, wherein the communication channel is associated with a Web site.

6. The method of claim 4, wherein the trader device is associated with at least one of: (i) the trader, or (ii) a client associated with a plurality of traders.

7. The method of claim 4, wherein the automated spread trading system is associated with a risk arbitrage trading strategy.

8. The method of claim 7, wherein the first investment comprises an acquirer stock and the second investment comprises a target stock.

9. The method of claim 4, wherein at least one of the investments are associated with a plurality of investments.

10. The method of claim 4, wherein the automated spread trading system is associated with a fixed income strategy.

11. The method of claim 4, wherein the trading parameter comprises at least one of: (i) a trader identifier, (ii) a trader device identifier, (iii) a client identifier, or (iv) an account identifier.

12. The method of claim 4, wherein the trading parameter comprises at least one of: (i) an investment identifier, (ii) a stock identifier, or (iii) a deal identifier.

13. The method of claim 4, wherein the trading parameter comprises at least one of: (i) a service, or (ii) an exchange.

14. The method of claim 4, wherein the trading parameter comprises at least one of: (i) a dividend value, (ii) a sell action, (iii) a round lot indication, or (iv) an order initiation indication.

15. The method of claim 4, wherein the trading parameter comprises at least one of: (i) a lower limit, (ii) an upper limit, (iii) a ratio, or (iv) a cash value.

16. The method of claim 4, wherein the trading parameter comprises a strategy associated with the first and second investments.

17. The method of claim 16, wherein the strategy comprises at least one of: (i) a follow spread strategy, (ii) a distribution strategy, (iii) a dollar-to-dollar strategy, (iv) a share-to-share strategy, or (v) an order-for-order strategy.

18. The method of claim 16, wherein the trading parameter comprises an authorization to automatically generate orders in accordance with the strategy.

19. The method of claim 4, wherein the trading parameter comprises at least one of: (i) a date, (ii) a time, (iii) a duration, (iv) start information, (v) end information, or (vi) a communication address independent of the temporary computer communication channel.

20. The method of claim 4, wherein said storing comprises storing the information in association with at least one of: (i) one of a plurality of traders, (ii) a client associated with a plurality of traders, or (iii) one of a plurality of accounts associated with a trader.

21. The method of claim 4, further comprising:
receiving a trader identifier; and
verifying the trader identifier.

22. The method of claim 4, further comprising:
determining risk control information.

23. The method of claim 22, wherein the risk control information comprises at least one of: (i) a maximum share position for the pair of investments, (ii) a maximum dollar position for the pair of investments, (iii) a maximum share position for an account, (iv) a maximum dollar position for an account, (v) a maximum open order shares amount for the pair of investments, (vi) a maximum open dollar amount for the pair of investments, (vii) a maximum number of open orders for the pair of investments, (viii) a maximum open order shares amount for an account, (ix) a maximum open dollar amount for an account, (x) a maximum number of open orders for an account, or (xi) a range around market price.

24. The method of claim 22, wherein said determining is based on at least one of: (i) trader information, or (ii) information received from an operator.

25. The method of claim 22, further comprising:
storing the risk control information for use by the automated spread trading system.

26. The method of claim 4, wherein the trading parameter is still stored after a termination of the temporary computer communication channel.

27. The method of claim 4, wherein the temporary computer communication channel is associated with a Web site.

28. A computer-readable medium storing instructions adapted to be executed by a processor to perform a method to facilitate spread trading, said method comprising:
receiving from a trader device an indication of a first investment;
receiving from the trader device an indication of a second investment;
storing an association between the first investment and the second investment;
receiving from the trader device a trading parameter to be associated with both the first and second investments, said receiving the trading parameter being performed via a temporary computer communication channel;
storing the received trading parameter, in association with both the first and second investments, for use by an automated spread trading system;
retrieving the stored trading parameter; and
transmitting the stored trading parameter, via the temporary computer communication channel, to the trader device for display to a trader.

29. A method to facilitate spread trading, comprising:
receiving from a trader device an indication of a first investment;
receiving from the trader device an indication of a second investment;

storing an association between the first investment and the second investment;

receiving from the trader device a trading parameter to be associated with both the first and second investments, said receiving the trading parameter being performed via a computer communication channel potentially accessible by a plurality of unrelated trader devices;

storing the received trading parameter, in association with both the first and second investments, for use by an automated spread trading system;

retrieving the stored trading parameter; and transmitting the stored trading parameter, via the temporary computer communication channel, to the trader device for display to a trader.

30. A method to facilitate spread trading, comprising:

receiving from a trader device an indication of a first investment;

receiving from the trader device an indication of a second investment;

storing an association between the first investment and the second investment;

receiving from the trader device a trading parameter to be associated with both the first and second investments, said receiving the trading parameter being performed via a public computer communication network;

storing the received trading parameter, in association with both the first and second investments, for use by an automated spread trading system;

retrieving the stored trading parameter; and transmitting the stored trading parameter, via the temporary computer communication channel to the trader device for display to a trader.

31. A computer-implemented method to facilitate risk arbitrage trading, comprising:

receiving a trader identifier via a Web site;

verifying the trader identifier;

receiving via the Web site the following information:
    an acquirer stock identifier,
    a target stock identifier,
    a selected risk arbitrage trading strategy, and
    an authorization to automatically generate orders in accordance with the strategy;

storing the received acquirer stock identifier in association with the received target stock identifier;

storing the received selected risk arbitrage trading strategy, in association with both the received acquirer stock identifier and received target stock identifier, for use by an automated spread trading system;

retrieving the stored selected risk arbitrage trading strategy; and transmitting an indication of the selected risk arbitrage trading strategy via a communication network to a device associated with the trader identifier.

* * * * *